United States Patent
Frank

[19]
[11] Patent Number: 5,937,350
[45] Date of Patent: *Aug. 10, 1999

[54] TRAIN RADIO TELEPHONE SYSTEM USING HOME LOCATION REGISTER (HLR)

[75] Inventor: Matthias Frank, Pforzheim, Germany

[73] Assignee: Alcatel N.V., Rijswijk, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/623,160

[22] Filed: Mar. 28, 1996

[30] Foreign Application Priority Data

Mar. 29, 1995 [DE] Germany ............................ 195 11 520

[51] Int. Cl.$^6$ ...................................................... H04B 7/26
[52] U.S. Cl. ........................ 455/433; 455/422; 455/443; 455/525; 455/526
[58] Field of Search ............................... 455/66, 426, 432, 455/433, 443, 431, 455, 516, 525, 526, 503, 422, 437, 442, 456, 11.1, 523, 434, 14, 15, 63, 62; 246/7, 8, 5; 370/328, 338

[56] References Cited

U.S. PATENT DOCUMENTS

| | | | |
|---|---|---|---|
| 4,209,749 | 6/1980 | Becker et al. | 455/15 |
| 4,399,330 | 8/1983 | Kuenzel | 455/456 |
| 4,926,421 | 5/1990 | Kawano et al. | 455/526 |
| 5,218,629 | 6/1993 | Dumond, Jr. et al. | 455/456 |
| 5,249,303 | 9/1993 | Goeken | 455/525 |
| 5,408,515 | 4/1995 | Bhagat et al. | 455/431 |
| 5,548,818 | 8/1996 | Sawyer et al. | 455/434 |
| 5,548,835 | 8/1996 | Sasaki | 455/456 |
| 5,586,338 | 12/1996 | Lynch et al. | 455/433 |

FOREIGN PATENT DOCUMENTS

| | | |
|---|---|---|
| 0240051 | 10/1987 | European Pat. Off. . |
| 9408406 | 4/1994 | WIPO . |

*Primary Examiner*—Reinhard J. Eisenzopf
*Assistant Examiner*—Lester G. Kincaid
*Attorney, Agent, or Firm*—Ware, Fressola, Van Der Sluys & Adolphson LLP

[57] ABSTRACT

A train radio system with a simple network structure that is suitable for a safe radio transmission. The train radio system comprises radio stations (R), which are arranged along a route, and a mobile station (MS) which is mounted in a vehicle moving along the route, and comprises a transceiver (TRX) and a data bank (HLR) that is connected thereto, into which identification codes (IDn, IDn+1) for the radio stations (R) can be entered. A signalling channel (ACH) is provided, through which each radio station (R) transmits its identification code to the mobile station to establish the radio link for checking into the data bank (HLR). In this way the mobile station (MS) forms a single traveling radio cell to provide radio to those radio stations (R) that are located inside this radio cell. The infrastructure, which essentially comprises the radio stations, can be realized simply and requires no costly network structure. Furthermore, two and more radio stations (R) can simultaneously check into the traveling radio cell, which makes a safe radio transmission possible.

20 Claims, 2 Drawing Sheets

TRAIN RADIO TELEPHONE SYSTEM USING HOME LOCATION REGISTER (HLR)

TECHNICAL FIELD

The invention concerns a train radio system with radio stations arranged along a route, as well as a mobile station for a vehicle that moves along the route.

BACKGROUND OF THE INVENTION

Such a train radio system and such a mobile station are known from DE 42 22 237 A1. The respective train radio system is described as a cellular radio system for a train radio, wherein adjacent radio stations use different radio frequencies, so that a number of radio cells are aligned in the form of a radio-cell chain along the route. The therein described mobile station inside the vehicle (train) is connected to that radio station in whose radio cell it is located. As described in DE 42 22 237 A2, to realize the train radio system in a simple manner, it is designed in accordance with the "GSM" (Global System for Mobile Communications) standard. A control device, which is connected to the radio stations, controls the establishment of a radio link from one radio cell to another while the train is traveling. However, in principle, handover within a cellular radio network requires a costly network structure. In this way for example, the GSM network requires radio switching stations with so-called home data banks and visitor data banks to check in the mobile station when establishing a radio link, and to determine the present and the next radio cell ("serving cell" and "target cell") when handing over the radio link. In addition, the known train radio system, whose network structure corresponds to the GSM standard, is unable to safeguard the radio transmission by simultaneously establishing two or more radio links between the mobile station and different radio stations.

DISCLOSURE OF INVENTION

The task of the invention is to present a train radio system and a mobile station in such a way, that the train radio system can be built with a simple network structure and is suitable for safeguarding the radio transmission.

According to a first aspect of the present invention, a train radio system comprising radio stations arranged along a route and a mobile station which is mounted in a vehicle moving along the route and comprises a transceiver, is characterized in that the mobile station further comprises a data base which is connected to the transceiver and in which identification codes of the radio stations can be entered, and that there is provided at least one signaling channel on which each radio station, to establish radio communication, transmits its identification code to the mobile station for checking into the data base.

According to a second aspect of the present invention, a mobile station for a vehicle moving along a route comprises a transceiver for radio communication with radio stations arranged along the route and is characterized in that the mobile station further comprises a data base which is connected to the transceiver and in which identification codes of the radio stations can be entered, and that the transceiver receives on a signaling channel that identification code which is transmitted by a respective one of the radio stations to check into the data base.

Accordingly the mobile station, which is located inside a vehicle, comprises a transceiver and a data bank connected thereto. Radio stations arranged along the vehicle route transmit identification codes to establish the radio link with the mobile station. Each identification code can be entered into the data bank to enable the respective radio station to check in. In this way the mobile station establishes a single traveling radio cell to provide radio to the radio stations located within this radio cell. The infrastructure, which essentially comprises the radio stations, is simple to realize. This infrastructure can be constructed and expanded without the costly network design that is required for conventional radio cell networks. In addition, two or more radio stations can simultaneously check into the traveling radio cell, thus making a safeguarded radio transmission possible.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
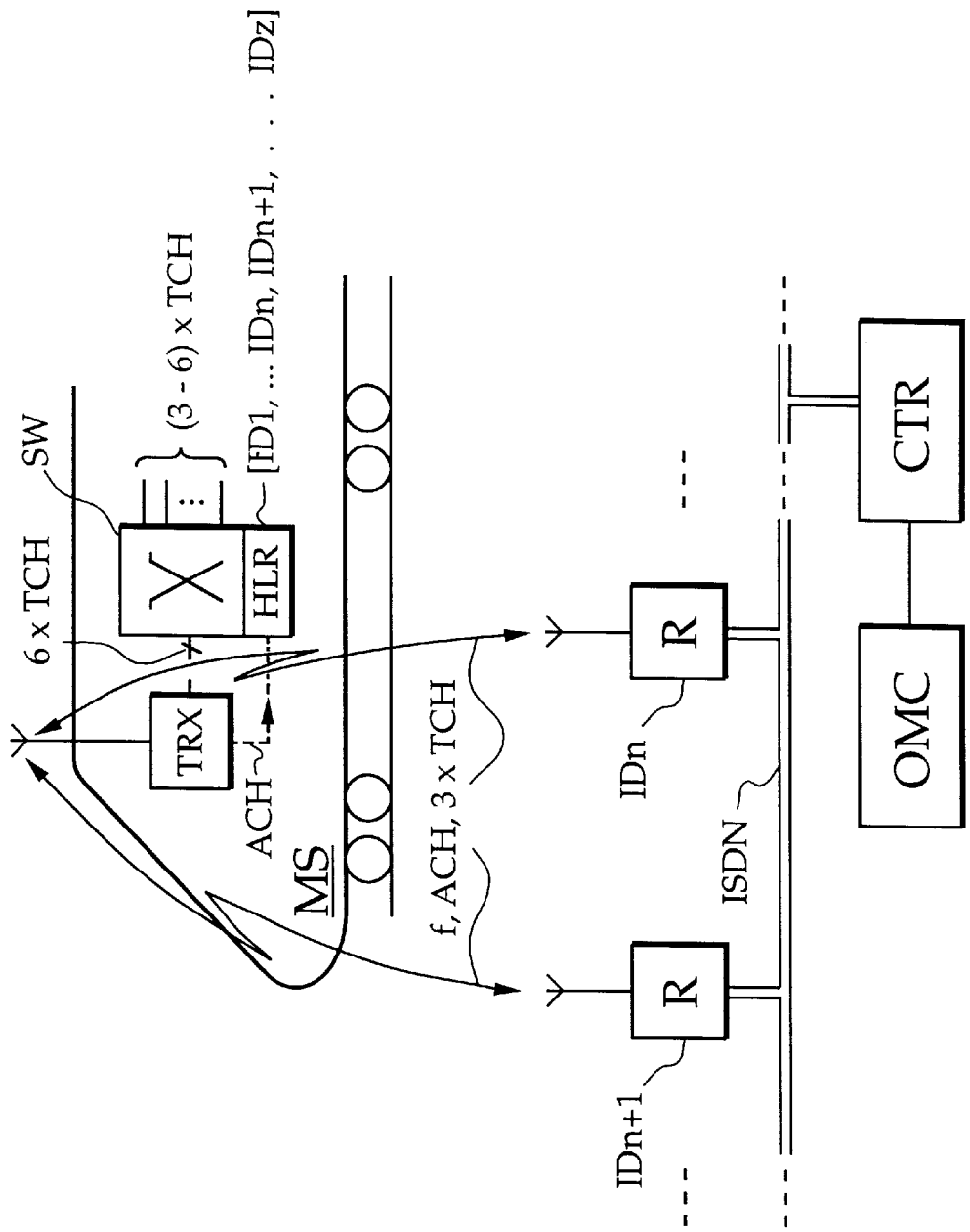
FIG. 1 schematically illustrates the construction of a train radio system for mobile railway radio.
Figure 2:
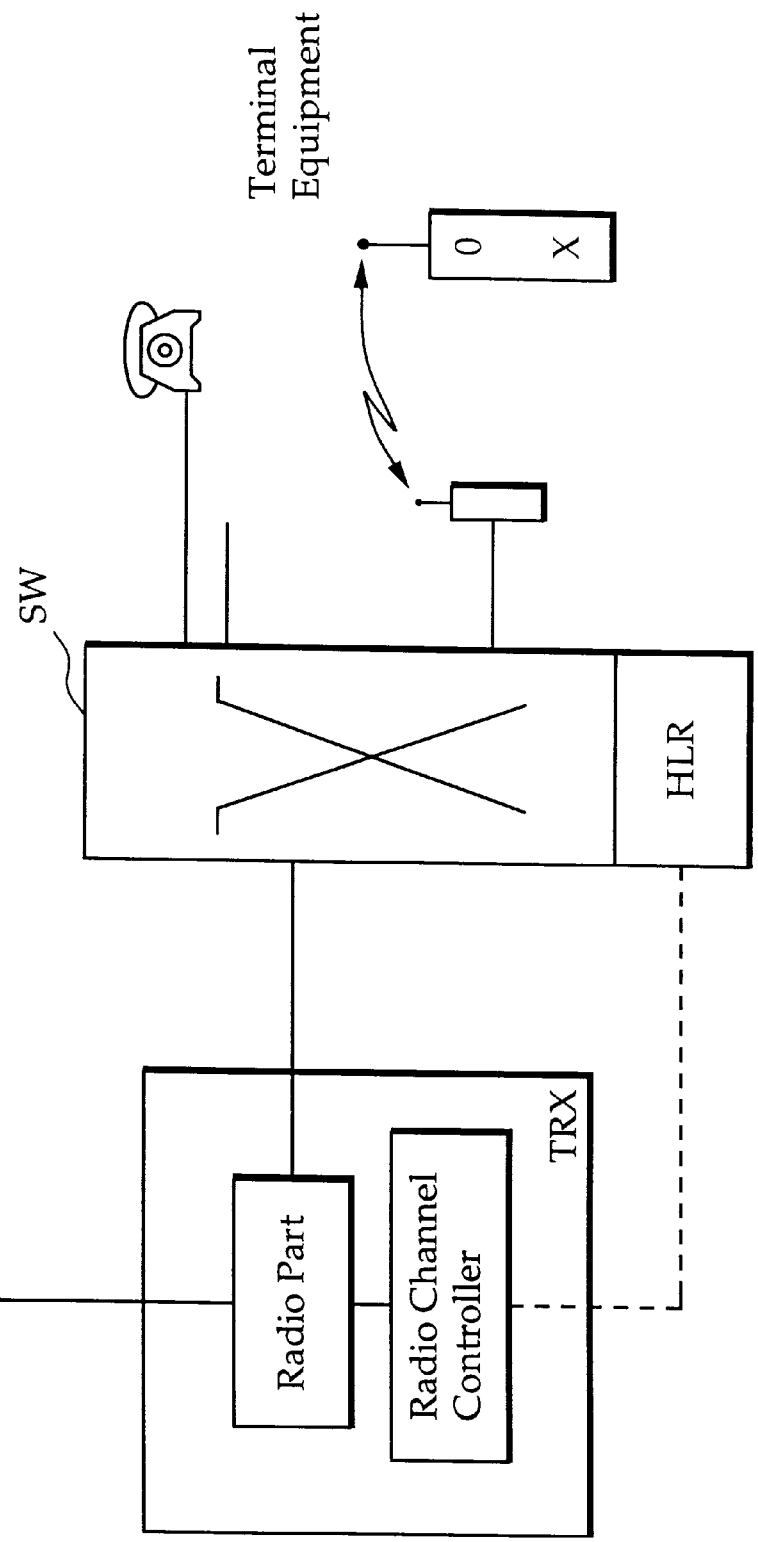
FIG. 2 shows a radio channel controller and terminal equipment according to the invention.

The train radio system illustrated by the figure comprises radio stations R, which are arranged along a route and are connected with a master computer CTR via a wireline network ISDN. The master computer is operated from an operation and maintenance central OMC.

In addition to the above named components, which form the infrastructure of the train radio system, the figure illustrates a vehicle that moves along the route and comprises a mobile station MS with a transceiver TRX, which exchanges radio signals with at least one of the radio stations R.

In this example, the mobile station MS is located in a high-speed train. The transceiver TRX as well as the radio stations R are essentially configured in accordance with the mobile radio standard GSM (Global System for Mobile Communications). Accordingly, the radio signals are TDMA signals which are transmitted on a carrier frequency $f \approx 900$ MHz. Six of eight TDMA channels serve as traffic channels TCH for the wireless telecommunication of speech and/or data signals. Two of the TDMA channels serve as signalling channels ACH through which the radio stations R transmit their respective identification codes (in this case e.g. IDn or IDn+1) to the mobile station MS, in order to check into the traveling radio cell.

For checking in, the mobile station MS contains a data bank HLR that is connected to the transceiver TRX, which contains the identification codes ID1, . . . IDn, IDn+1, . . . IDz of all the radio station R that are arranged along the route. In this instance, the data bank HLR is part of a communications computer which controls a switching device SW that is connected to the transceiver TRX. This switching device is used to switch the traffic channels TCH to terminal equipment for remote monitoring of the high-speed train, for operating communications or for public communications. Accordingly, the train radio system is used to influence the radio train as well as for the public mobile radio. In this case the communications computer is a personal computer, which also controls the assignment of idle traffic channels TCH to the radio stations R that signal a desire for a radio link. In this way, the communications computer is also configured for radio channel control. The exact manner of operation of the train radio system illustrated by the figure will now be described:

The identification codes ID1 to IDz of the radio stations R are entered into the data bank HLR before the high-speed train begins to roll. To that effect, the communications computer reads the identification codes from a data carrier, such as e.g. a floppy disk or a CD-ROM. In addition to the identification codes, this data carrier also contains other data for the train's timetable, such as perhaps stops, arrival and departure times.

To establish a radio connection between the mobile station MS and the radio stations R along the route, radio signals in the frequency duplex and in the TDMA mode according to the GSM standard are exchanged. The figure only indicates the carrier frequency f for the radio link from the radio stations R to the mobile station MS. Two signalling channels ACH and six traffic channels TCH are arranged on this carrier frequency.

The illustrated train radio system is a common-frequency radio system, i.e. a radio system that uses only one downward carrier frequency f=960 MHz and only one (not illustrated) upward carrier frequency f'=915 MHz. The radio stations R, which are connected to each other via the ISDN network, are synchronized and are arranged within visual range of each other. This allows two of the radio stations R to have a line-of-sight radio link with the mobile station MS, which is necessary to safely influence the radio train. The master computer CTR controls the radio stations R via the ISDN network, so that two adjacent radio stations always exchange TDMA radio signals with the mobile station MS. To that effect, each of the two radio stations R transmits in the downward direction through one of the two signalling channels ACH and through three of the six traffic channels TCH. The reception in the upward direction takes place accordingly. The establishment and release of a radio link takes place as follows:

When the train starts to travel, the operation and maintenance central OMC operates the master computer CTR in a way so that the latter controls the switching of those two radio stations which are closest to the train (in the departure station). These radio stations signal their respective identification codes (in this case ID1 and ID2) to the mobile station. The communications computer compares the identification codes received by the transceiver TRX of the mobile station with the identification codes entered into the data bank HLR. If the communications computer determines that the received identification codes coincide with the entered ones, the communications computer controls the assignment of the traffic channels TCH to the radio stations. Data and speech signals are exchanged via these traffic channels between the terminals located in the train and the terminals connected to the ISDN network.

The terminals that are located in the train, such as for example on-board computers, telephone stations for operating communications or telecommunications terminals for the passengers, are connected to the switching device SW. The terminals that are connected to the ISDN network (not illustrated) are e.g. computers for influencing the train, or public telecommunications network exchanges. The master computer CTR controls the radio stations so that the data for influencing the radio train are exchanged redundantly, in parallel, to the mobile station MS via two adjacent radio stations R. To that end, the same data signal is sent through a traffic channel TCH of the one radio station R, and through a traffic channel TCH of the other. In this way the data is transmitted via two independent radio paths to safeguard the radio train influence. For the transmission of messages not requiring safeguarding, the remaining traffic channels are only used singly. Before engaging each traffic channel TCH, the communications computer, which is connected to the switching device SW, tests whether the traffic channel has a minimum transmission quality, which is accomplished by means of a predetermined bit error rate. During travel, the train's radio communications are switched from one radio station to another in the following manner:

Both the communications computer on board of the high-speed train and the master computer CTR monitor the existing radio links. If the master computer CTR determines first that a radio link has deteriorated (in this case e.g. the radio link between the mobile station MS and the radio station R with the identification code IDn), the master computer CTR switches to the next radio station appearing in accordance with the train's traveling direction, in order to control the transmission of the identification code (in this case IDn+2). The communications computer then assigns radio channels to this radio station by reversing the two identification codes (i.e. from IDn to IDn+2 in this case). The other radio link, (in this case between the mobile station and the radio station with the identification code IDn+1) remains in effect. The above described switch-over can be activated from the mobile station MS, if it detects a deterioration of the radio link before the communications computer does.

The described radio link switch-over takes place during common-frequency operation, so that a change in carrier frequencies is not required. Therefore a further handoff of radio communications, such as is required for conventional cellular radio systems, is omitted. Thus the problem of a so-called mass handoff, i.e. a simultaneous handoff of multiple radio links, cannot take place. Both the mobile station and the radio stations are therefore constructed in a very simple manner. The switch-over of the radio link can also be envisioned through monitoring of the signal transfer times, which also represent a measure of the transmission quality. A switch-over without monitoring can also be envisioned, whereby the master computer controls the on and off switching of the corresponding radio station on the basis of the train's known stop times in each individual section of the route. To establish and release the radio links, it can also be envisioned that the radio stations monitor one of the signalling channels through which the mobile station transmits a synchronization signal. When this synchronization signal is received by a radio station, it automatically transmits its identification code and thereby signals a desire for a radio link with the mobile station. In the train radio system described herein, common-frequency radio signals are transmitted in accordance with the TDMA system. The use of other transmission modes, such as perhaps CDMA, can also be envisioned. Furthermore, the construction of a train radio system according to the invention, with a cellular i.e. multifrequency network structure, can also be envisioned.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A train radio system comprising radio stations (R) arranged along a route and a mobile station (MS) which is mounted in a vehicle moving along the route and comprises a transceiver (TRX), characterized in that the train radio system is a common-frequency radio system that uses only one downward carrier frequency and only one upward carrier frequency throughout the system, that adjacent radio stations are arranged within visual range of each other along said route, that two of the radio stations (R) are always exchanging radio signals with the mobile station (MS) at a time, that the mobile station (MS) further comprises a data base (HLR) which is connected to the transceiver (TRX) and in which identification codes (Idn, Idn+1) of the radio stations (R) can be entered, and that there is provided at least one signalling channel (ACH) on which each radio station (R), to establish radio communication, transmits its identification code to the mobile station (MS) for checking into the data base (HLR).

2. A train radio system as claimed in claim 1, characterized in that the transceiver is a multichannel transceiver (TRX) containing a radio channel controller which assigns at least one idle traffic channel (TCH) to the checked-in radio stations (R) for establishing the radio communication.

3. A train radio system as claimed in claim 2, characterized in that the traffic channels (TCH) are TDMA and/or CDMA channels of a common-frequency radio link.

4. A train radio system as claimed in claim 2, characterized in that the transceiver (TRX) is connected to a switching device (SW) which switches only those traffic channels (TCH) to terminal equipment of the vehicle which have a predeterminable minimum transmission quality.

5. A train radio system as claimed in claim 2, characterized in that the traffic channels (TCH) are speech and/or data channels.

6. A train radio system as claimed in claim 1, characterized in that said at least two of the radio stations transmit information to the mobile station on a same downlink frequency, and that the mobile stations transmits to the at least two radio stations on a same uplink frequency that is different from said downlink frequency.

7. A train radio system as claimed in claim 1, characterized in that the radio stations (R) are connected via a wireless network or a wireline network (ISDN) to a master computer (CTR) which is operable from an operation and maintenance center (OMC) of the train radio system, and which, to establish the radio communication, controls the radio stations (R) on the basis of timetable data such that at least two of the radio stations (R) are in radio communication with the mobile station (MS) at a time.

8. A train radio system as claimed in claim 1, characterized in that the mobile station transmits a synchronization signal on the at least one signalling channel, and that the radio stations monitor the at least one signalling channel and, upon reception of the synchronization signal, transmit their respective identification codes to the mobile station for establishing radio communication with the latter.

9. A train radio system as claimed in claim 1, characterized in that the radio stations (R) transmit to the mobile station (MS) on a same frequency downlink and that the mobile stations transmits to the radio stations on an uplink frequency different from said downlink frequency.

10. A mobile station (MS) for a vehicle moving along a route, said mobile station (MS) comprising a transceiver (TRX) for radio communication with radio stations (R) arranged along the route, characterized in that the train radio system is a common-frequency radio system that uses only one downward carrier frequency and only one upward carrier frequency throughout the system, that adjacent radio stations are arranged within visual range of each other along said route, that two of the radio stations (R) are always in radio communication with the mobile station (MS) at a time, that the mobile station (MS) further comprises a data base (HLR) which is connected to transceiver (TRX) and in which identification codes (Idn, Idn+1) of the radio stations (R) can be entered, and that the transceiver (TRX) receives on a signalling channel (ACH) that identification code which is transmitted by a respective one of the radio stations to check into the data base.

11. A train radio system comprising radio stations (R) along a route and a mobile station (MS) which is mounted in a vehicle moving along the route and comprises a transceiver (TRX), characterized in that the train radio system is a common-frequency radio system that uses only one downward carrier frequency and only one upward carrier frequency throughout the system, that adjacent radio stations are arranged within visual range of each other along said route, that the mobile station (MS) further comprises a data base (HLR) which is connected to the transceiver (TRX) and in which identification codes (IDn, IDn+1) of the radio stations (R) arranged along the route are entered prior to said vehicle moving along the route, and that there is provided at least one signaling channel (ACH) on which each radio station (R), to establish radio communication, transmits its identification code to the mobile station (MS) in the vehicle moving along the route for checking into the data base (HLR), wherein each said radio stations (R) are controlled so that two adjacent radio stations along the route are always exchanging line-of-sight radio signals with the mobile station as the vehicle travels by, for establishing a traveling radio cell with redundant radio communication with the vehicle moving along the route as the vehicle travels by.

12. A train radio system as claimed in claim 11, characterized in that the transceiver is a multichannel transceiver (TRX) containing a radio channel controller which assigns at least one idle traffic channel (TCH) to the checked-in radio stations (R) for establishing the radio communication.

13. A train radio system as claimed in claim 12, characterized in that the traffic channels (TCH) are TDMA and/or CDMA channels of a common-frequency radio link.

14. A train radio system as claimed in claim 12, characterized in that the transceiver (TRX) is connected to a switching device (SW) which switches only those traffic channels (TCH) of the two or more checked in radio stations (R) to terminal equipment of the vehicle which have a predeterminable minimum transmission quality.

15. A train radio system as claimed in claim 12, characterized in that the traffic channels (TCH) are speech and/or data channels.

16. A train radio system as claimed in claim 11, characterized in that said two adjacent radio stations transmit information to the mobile station on a same downlink frequency, and that the mobile station transmits to the two adjacent radio stations on a same uplink frequency that is different from said downlink frequency.

17. A train radio system as claimed in claim 11, characterized in that the radio stations (R) are connected via a wireless network or a wireline network (ISDN) to a master computer (CTR) which is operable from an operation and maintenance center (OMC) of the train radio system, and which, to establish the radio communication, controls the radio stations (R) on the basis of timetable data such that at least two of the radio stations (R) are in radio communication with the mobile station (MS) at a time.

18. A train radio system as claimed in claim 11, characterized in that the mobile station transmits a synchronization signal on the at least one signalling channel, and that the radio stations monitor the at least one signalling channel and, upon reception of the synchronization signal, transmit their respective identification codes to the mobile station for establishing radio communication with the latter.

19. A train radio system as claimed in claim 11, characterized in that the radio stations (R) transmit to the mobile station (MS) on a same frequency downlink and t hat the mobile stations transmits to the radio stations on an uplink frequency different from said downlink frequency.

20. A mobile station (MS) for a vehicle moving along a route, said mobile station (MS) comprising a transceiver (TRX) for radio communication with radio stations (R) arranged along the route, wherein radio stations (R) are synchronized and arranged within visual range of each other along said route so that two adjacent radio stations (R) are always exchanging radio signals with the mobile station (MS), wherein the mobile station (MS) further comprises a data base (HLR) which is connected to the transceiver (TRX) and in which identification codes (IDn, IDn+1) of the radio stations (R) can be entered, and that the transceiver (TRX) is responsive on a signaling channel (ACH) to that identification code which is transmitted by a respective one of the radio stations along said route to check into the data base as the vehicle travels by and wherein all the radio stations along the route use only one common downward carrier frequency and only one common upward carrier frequency throughout.

* * * * *

UNITED STATES PATENT AND TRADEMARK OFFICE
CERTIFICATE OF CORRECTION

PATENT NO : 5,937,350
DATED : August 10, 1999
INVENTOR(S): M. Frank

It is certified that error appears in the above-identified patent and that said Letters Patent is hereby corrected as shown below:

On the title page, item:

[56] References Cited, after line 14, please insert:

--OTHER PUBLICATIONS

"CDMA--ein günstiges Vielfachzugriffs-verfahren für frequenzselektive und zeitvariante Mobilfunkkanänale", P. Baier et al, Nachrichtentechn., Elektron., Berlin 41 (1991) 6, pp. 223-234.--.

Signed and Sealed this

Eighth Day of August, 2000

*Attest:*

Q. TODD DICKINSON

*Attesting Officer*  *Director of Patents and Trademarks*